(12) United States Patent
Autio et al.

(10) Patent No.: US 7,684,827 B2
(45) Date of Patent: Mar. 23, 2010

(54) METHOD FOR ENABLING A COMMUNICATION VIA A MOBILE PHONE AND MOBILE PHONE ENABLING A COMMUNICATION

(75) Inventors: Markku Autio, Oulu (FI); Esa Nettamo, Oulu (FI)

(73) Assignee: Nokia Corporation, Espoo (FI)

( * ) Notice: Subject to any disclaimer, the term of this patent is extended or adjusted under 35 U.S.C. 154(b) by 1166 days.

(21) Appl. No.: 10/505,085

(22) PCT Filed: Jan. 17, 2003

(86) PCT No.: PCT/IB03/00107

§ 371 (c)(1),
(2), (4) Date: Aug. 18, 2004

(87) PCT Pub. No.: WO03/071768

PCT Pub. Date: Aug. 28, 2003

(65) Prior Publication Data

US 2005/0108314 A1    May 19, 2005

(30) Foreign Application Priority Data

Feb. 19, 2002    (EP) .................................. 02003202

(51) Int. Cl.
*H04M 1/00* (2006.01)
(52) U.S. Cl. ................. 455/566; 455/550.1; 455/556.2; 455/418
(58) Field of Classification Search ................. 455/566, 455/550.1, 564, 556.2, 418, 414.1–414.2; 715/744–747, 760, 765, 788, 810, 841, 857, 715/975; 716/788, 810; 345/51, 173, 169, 345/173 M, 2.3; 379/88.11, 122, 93.17, 142.17, 379/93.23, 428.03, 136
See application file for complete search history.

(56) References Cited

U.S. PATENT DOCUMENTS 5,644,628 A    7/1997    Schwarzer et al. ....... 379/93.19

(Continued)

FOREIGN PATENT DOCUMENTS

EP    0 946 028    9/1999

(Continued)

OTHER PUBLICATIONS http://svetart.tripod.com "Call PC to Phone, PC to PC, phone to phone" (6 pages), Oct. 20, 2004.

(Continued)

*Primary Examiner*—Kamran Afshar
(74) *Attorney, Agent, or Firm*—Alston & Bird LLP

(57) ABSTRACT

A method for enabling a communication via a mobile phone enables a comfortable creation of communications during a context of a mobile phone provided by a conventionally static application. It is proposed that the method comprises as a first step displaying information 2,3,4 available for a specific content on a display of the mobile phone. In a next step, it is detected whether a user selected a displayed information 4,5. In case an information 4,5 is selected, the kind of the selected information is determined. Then, functions 6,7 associated to the kind of the selected information are presented on the display. To at least one kind of possible information the establishment of at least one kind of communication is associated as at least one function. Finally, a function 7 selected by a user is activated. The invention relates equally to a corresponding mobile phone.

15 Claims, 4 Drawing Sheets

U.S. PATENT DOCUMENTS

| | | | |
|---|---|---|---|
| 6,178,338 B1 | 1/2001 | Yamagishi et al. | 455/566 |
| 6,309,305 B1* | 10/2001 | Kraft | 455/566 |
| 6,430,405 B1* | 8/2002 | Jambhekar et al. | 455/403 |
| 6,570,596 B2* | 5/2003 | Frederiksen | 715/808 |
| 6,781,575 B1* | 8/2004 | Hawkins et al. | 455/566 |
| 2002/0072395 A1* | 6/2002 | Miramontes | 455/566 |
| 2002/0115476 A1* | 8/2002 | Padawer et al. | 455/564 |
| 2003/0013483 A1* | 1/2003 | Ausems et al. | 455/556 |

FOREIGN PATENT DOCUMENTS

| | | |
|---|---|---|
| GB | 2 355 142 | 4/2001 |
| WO | WO 99/37075 | 7/1999 |
| WO | WO 01/50712 | 7/2001 |

OTHER PUBLICATIONS

Chinese Office Action dated Sep. 12, 2008, 2 pages filled in Second Office Action form in English, 5 pages English translation of Text of Second Office Action and 5 pages Chinese originals of both the form and the Text of the Second Office Action.

\* cited by examiner

METHOD FOR ENABLING A COMMUNICATION VIA A MOBILE PHONE AND MOBILE PHONE ENABLING A COMMUNICATION

CROSS REFERENCE TO RELATED APPLICATIONS

This application is the U.S. National Stage of International Application PCT/IB03/00107 filed Jan. 17, 2003, and applicant claims priority from European Patent Application No. 02003202.5 filed Feb. 19, 2002.

BACKGROUND OF THE INVENTION

1. Technical Field

The invention relates to a method for enabling a communication via a mobile phone. The invention relates equally to a mobile phone enabling a communication, which mobile phone comprises a display and processing means.

2. Discussion of Related Art

Mobile phones, like personal digital assistant (PDA) phones, are well known from the state of the art.

Such mobile phones usually comprise processing means providing a variety of functions and a display for presenting pieces of information to a user in accordance with a current context.

A mobile phone can be used in particular for communication purposes. In order to enable a communication, conventional mobile phones usually comprise an application managing a phonebook, which application is run by the processing means of the phone. When the user opens the phonebook, a list of stored phone numbers are presented on the display. The user can then select one of these numbers by means of a number parser. Alternatively, the user can input a desired phone number manually. The selected or the input number is used for establishing a desired connection, e.g. for a phone call, for sending an SMS (short message service) message or for transmitting a facsimile.

Mobile phones moreover often comprise static applications presenting some content on a display of the mobile phone, which content is not restricted to comprise a specific kind of information, e.g. a calendar, a browser or a messaging application. In some cases, a presented content will comprise a contact information based on which a connection could be established. Such a contact information can be for instance a phone number that might be used for establishing a phone call.

Known applications of this kind, however, do not comprise any immediate communication features themselves. They lack in particular call creation possibilities. For example, in case a user wants to establish a call to a phone number presented in a calendar, the user has first to enter the number again, or, in case the number is stored in the phonebook, to open a phonebook and select the number, before a connection can be established. This is obviously rather annoying for a user, since the desired phone number was already displayed. A direct manipulation method, which comprises tapping the number, further results in a high error rate. The same applies to other connection related information, e.g. email addresses or fax-numbers.

SUMMARY OF THE INVENTION

It is an object of the invention to enable a comfortable creation of communications during a context of a mobile phone induced by a conventionally static application.

This object is reached according to the invention on the one hand by a method for enabling a communication via a mobile phone. It is proposed that the method comprises as a first step displaying information available for a specific content on a display of said mobile phone. In a second step, it is detected whether a user selected a displayed information. In case an information is selected, the kind of the selected information is determined. Next, functions of the mobile phone associated to the selected kind of information, if any, are offered on the display to the user. To at least one kind of possible information the establishment of at least one kind of communication is associated as at least one function. Finally, if one of the offered functions is selected by a user, this function is activated.

On the other hand, the object of the invention is reached by a mobile phone comprising a display and processing means for realizing the steps of the proposed method.

The invention proceeds from the idea that also conventionally static applications could be adapted in a way that they provide a direct user interface for a communication. To this end, it is ensured that information presented on the display of a mobile phone can be selected by a user. The selectable information may be restricted, e.g. to alphanumeric information. At least one kind of information that can be selected should identify a specific connection.

In conventional applications provided explicitly for the establishment of a connection, the kind of information that can be selected in a specific context is always definite. The invention, in contrast, allows a user to select more than one kind of information presented for a specific content. Therefore, it is further provided that the kind of an information that has been selected is determined. There may be only a single kind of information to which a function is associated, e.g. to phone numbers. But even in this case, the step of determining the kind of selected information is required for detecting whether a selected information is of this one kind or of another kind. To each kind of information, a variety of functions might be associated, of which at least one function consists in the establishment of a communication. All functions associated to a determined kind of information are offered to a user of the phone, who can then call a desired function by selecting it.

It is thus an advantage of the invention that it facilitates calling a communication related function. It is in particular an advantage that such a function is associated to a presented information and can be called directly from an application which is realized conventionally in a static manner. The provided user interface enables thereby an easy and intuitive establishment of a communication.

It is moreover an advantage of the invention that it constitutes a revalorization of already existing applications.

The operating system Microsoft Windows® offers for PCs (personal computer) an opportunity to get a menu to a displayed text by clicking the right mouse button. The appearing menu functions can then be selected to be applied to the currently selected text. Even though this constitutes a similar approach as the approach of the invention, it is not known to be transferable to connections created via mobile phones.

Preferred embodiments of the application become apparent from the description which follows.

The content can be provided by any application which enables the presentation of information that identifies a specific connection. The application can be in particular a calendar, a browser and/or a messaging application.

The information to which at least one function is associated can be in particular alphanumeric information, like a phone number, a fax number or an email-address. But it is also possible to assign functions to other information, e.g. to an image of a person presented in a calendar, to which person a phone number is associated, even though the phone number itself is not necessarily displayed.

Possible functions which establish a communication and which are associated to a phone number are for example a call setup and a transmission of an SMS. Additionally offered functions that are not related to the establishment of a connection are not restricted in any way. There may be e.g. the option to store a selected number in a phonebook etc.

In a preferred embodiment of the invention, the selectable functions associated to a selected kind of information are presented by the processing means as graphical icons, even though a presentation as displayed text is possible as well. In a conventional application, a user might establish a call by accident, when he/she only intends to copy a number from the screen. Using graphical icons popping up on the display in order to provide a possibility to establish a connection, in contrast, does not interfere with the normal usage of a presented content.

The method according to the invention can be realized in particular as a new software component on the operating system level of a mobile phone.

BRIEF DESCRIPTION OF THE FIGURES

Other objects and features of the present invention will become apparent from the following detailed description of an exemplary embodiment of the invention considered in conjunction with the accompanying drawings, of which.

DETAILED DESCRIPTION OF THE INVENTION

The invention is described by way of example for a PDA phone, which comprises a display, processing means, and means for communicating with other terminals or with a server via a mobile communication network. The processing means are suited to run different applications and to present a corresponding content on the display of the phone. The processing means further run an operating system to which a new software component was added for realizing the features of the invention.

The PDA phone provides on the one hand conventional ways of establishing a connection with another terminal. On the other hand, it enables the establishment of a connection in accordance with the invention.

Figure 1:
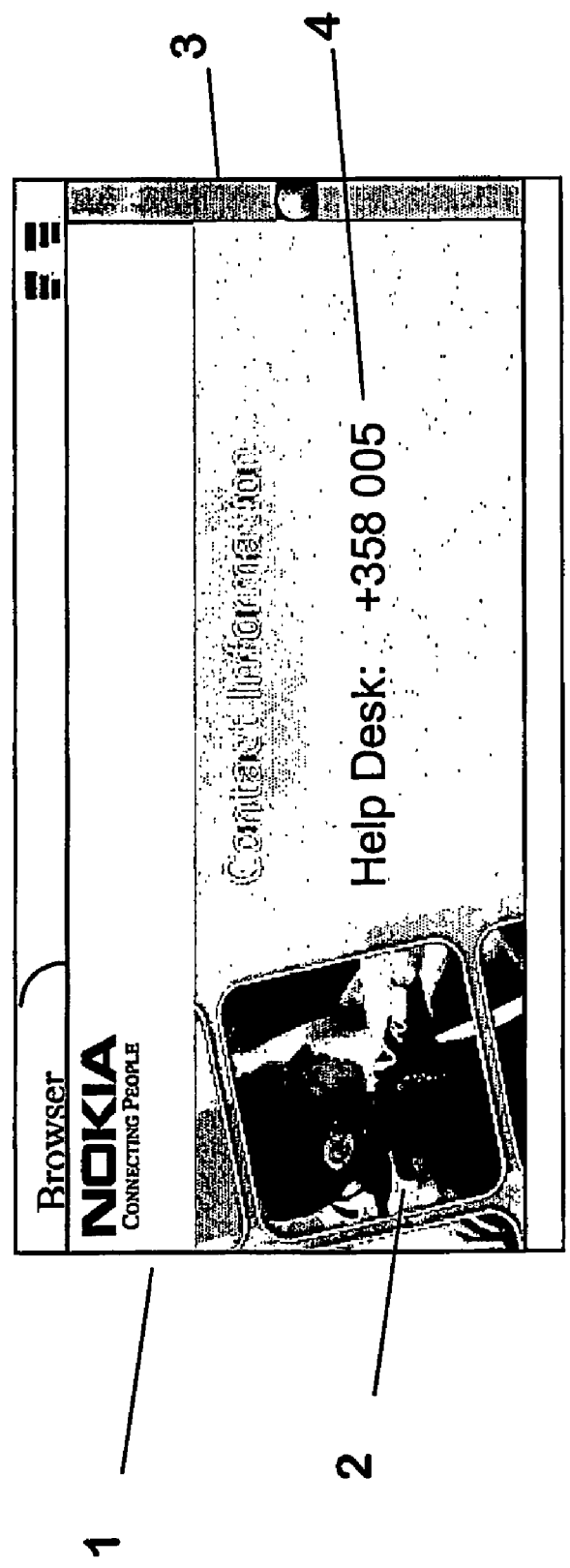
FIG. 1 is a first view on a display of a mobile phone according to the invention.
Figure 2:
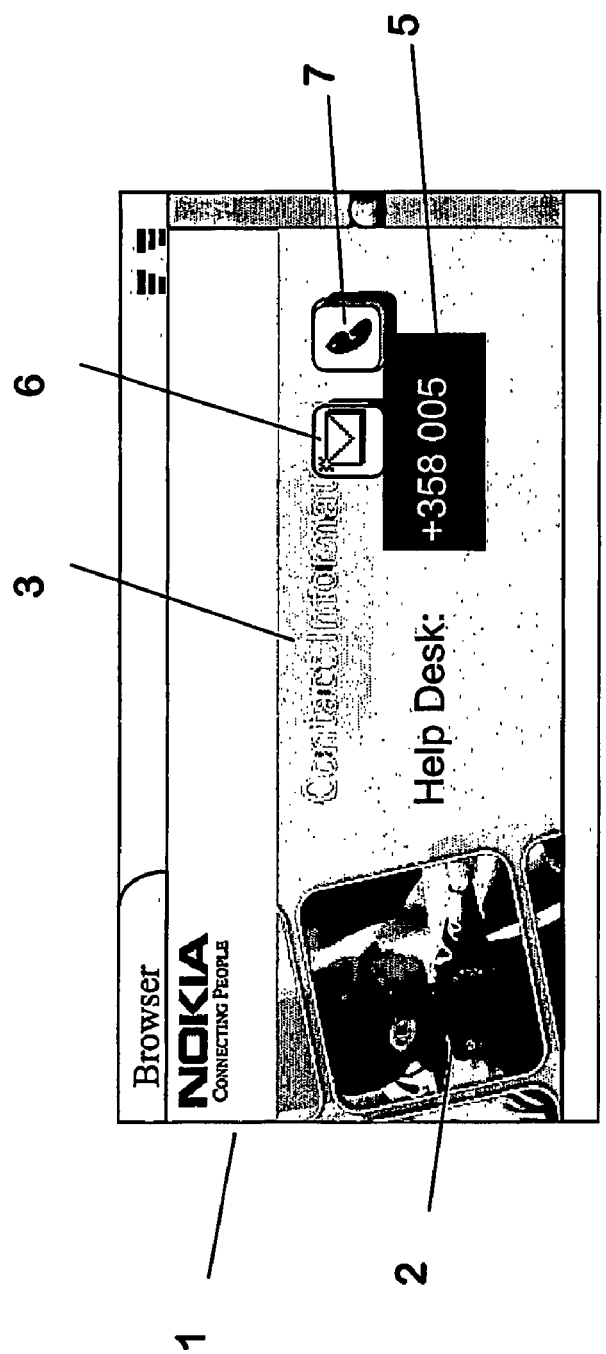
FIG. 2 is a second view on a display of a mobile phone according to the invention.
Figure 3:
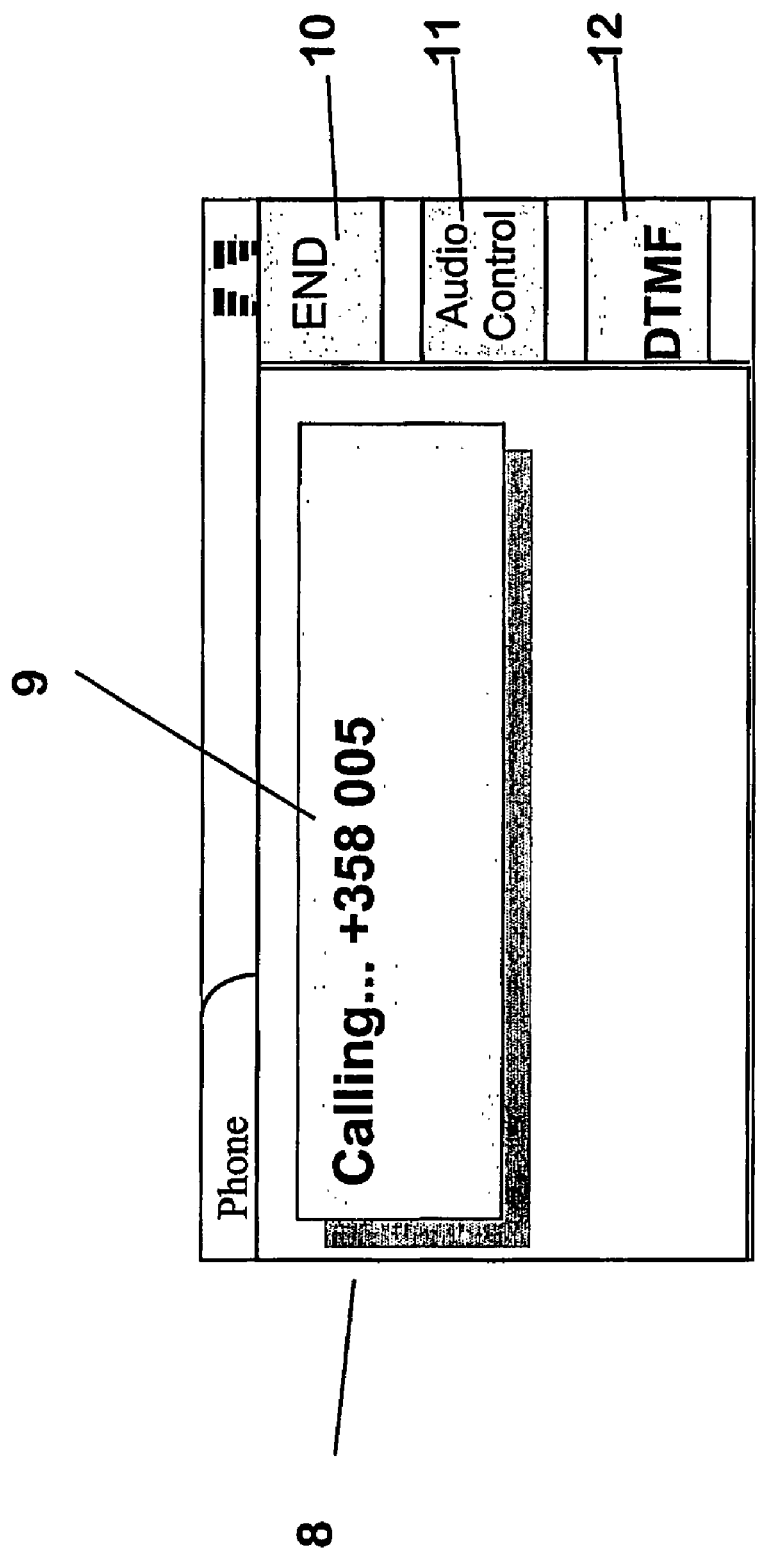
FIG. 3 is a third view on a display of a mobile phone according to the invention.

The latter possibility is illustrated by FIGS. 1 to 3, which present a view on the display of the PDA phone in different stages. These stages will now be described.

A user of the phone starts a browser, which is displayed on the display by a corresponding application run by the processing means. The user further opens the contact information page of a company in the browser.

FIG. 1 presents the browser showing this contact information page 1. The contact information page 1 comprises graphical images 2, e.g. an image of a contact person. The contact information page 1 further comprises the indication "Contact Information" 3 as well as the phone number of a help desk 4.

The user is enabled by the operating system to select any presented alphanumeric information. In case the user now desires to contact the help desk of the company, he/she highlights the presented phone number 4 with a stylus. This selection is indicated in FIG. 2, which shows the same contact page 1 in the called browser as FIG. 1, by a presentation of the phone number 5 and its immediate background with inverted colors.

The new component of the operating system registers the selection of a presented alphanumeric information 5 and tries to determine the kind of the selected information. In the presented case, the operating system is able to interpret the selection as a phone number by a number parser.

The new component of the operating system now determines all functions associated to phone numbers. The association of functions to different kinds of information is predetermined in the operating system. In the presented embodiment, the functions associated to phone numbers are sending an SMS and establishing a call.

Both determined functions are offered to the user by graphical icons. The SMS function is represented more specifically by an envelop 6 and the call establishment function by a telephone receiver 7. These graphical icons 6, 7 are depicted in FIG. 2 close to the selected phone number 5 in addition to the page content of the contact page 1 as shown in FIG. 1.

The user is able to select the transmission of an SMS or the establishment of a call to the indicated number by tapping onto the corresponding icon 6, 7 with the stylus. In the described example, the user chooses to talk to the help desk. He/she thus taps onto the graphical icon representing the telephone receiver 7.

This selection is recognized as well by the new component of the operating system, which initiates thereupon the setup of a call.

FIG. 3 presents as third view on the display a call handling view 8. This view indicates that a connection to the selected number 9 is in the course of being established. Options are provided in this view for ending the call 10, for an audio control 11 and for selecting DTMF (Dual-Tone MultiFrequency) 12.

As becomes apparent from the described embodiment, the invention provides a communication enhancing feature for mobile phones. This feature is usable with all applications which may present alphanumeric information, but which provide conventionally no user interface for establishing a connection to another terminal or to some server.

Figure 4:
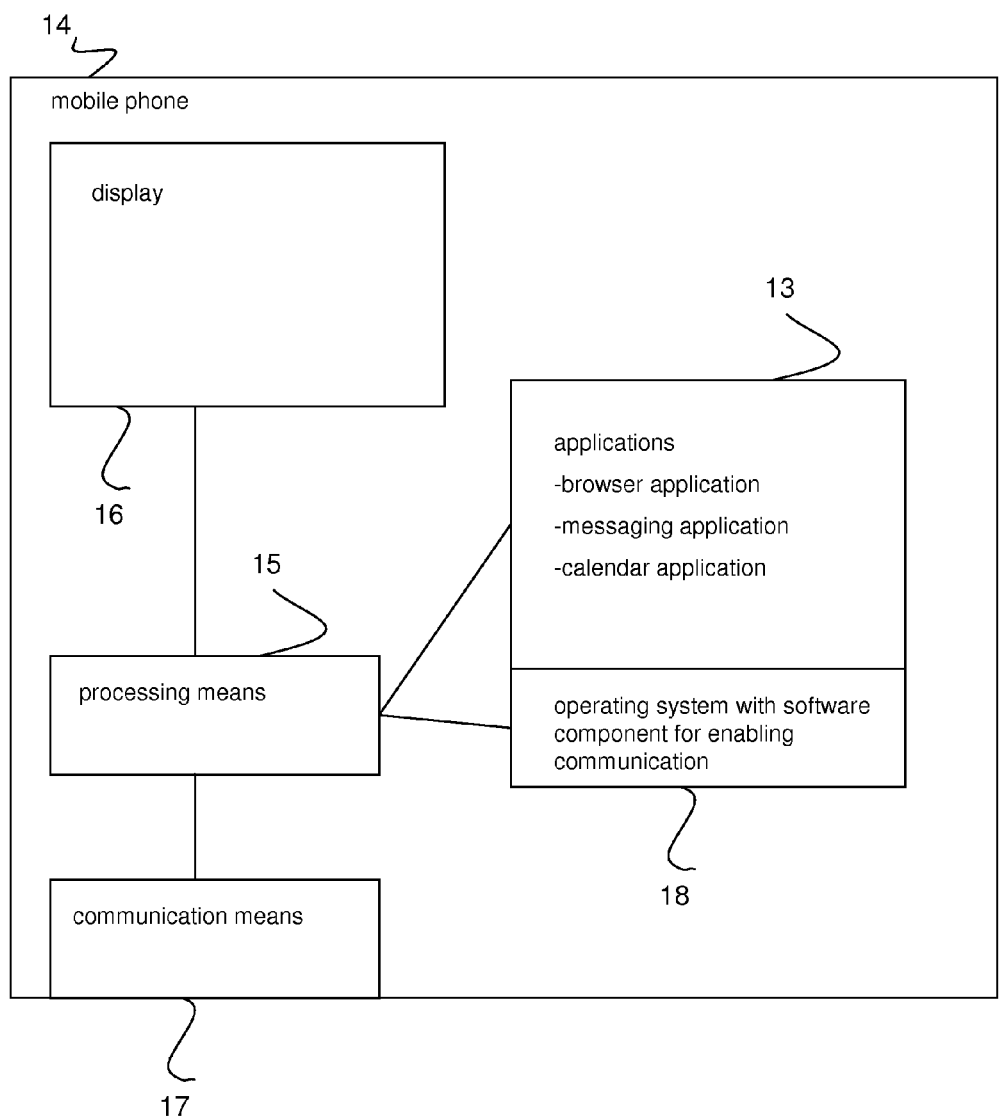
FIG. 4 shows a device or apparatus able to carry out the disclosed methodologies.

As shown in FIG. 4, a mobile electronic device such as a mobile phone 14 will have software coded and stored in a memory device 13, 18 (shown as storing applications and an operating system) within the mobile phone for executing the steps illustrated in FIGS. 1, 2 and 3. In addition to a display 16, keyboard, stylus and all of the related radio transceiver equipment, such a mobile device 14 will use the display 16 for displaying information available for specific content such as the contact information shown in FIG. 1. The device will have a detector, e.g., in software, for detecting a selection of a displayed information such as shown in FIG. 1 by a user such as by a keypad, touchscreen, stylus or the like. Once the selection of the user is detected, the kind of displayed information that has been selected is determined by a device, e.g., implemented by the processing component 15 in conjunction with software, for determining the kind of displayed information selected by the user. For instance, if the user selects the displayed information 4 shown in FIG. 1, the determining device will determine that it is a displayed telephone number that is selected as per step 5 of FIG. 2. Since a telephone number can be used for various purposes including SMS, facsimile, voice telephone call, a text message, a multi-media message, etc., the methodology of the present invention will result in the offering of various functions 6, 7 such as shown in FIG. 2 associated with the selected information 5. At least one kind of possible information is of course associated with the at least one function. Once this is offered on the display, the user can then select whichever function is desired and there will be a device within the mobile phone which will be able to detect that selection. There will then be an activation device signal to activate the function selected, such as a telephone call as shown in FIG. 3 where a display is presented to the user to notify him that the call is in progress.

Thus FIG. 4 can also be viewed as showing apparatus such as a mobile phone 14 that includes processing means 15 configured to provide display information available for a specific content to display means 16 coupled to the processing means. The processing means may be configured run a calendar application, a browser application or a messaging application, which applications are configured to present said information on said display means. The processing component may also be configured to detect a selection of displayed information by a user such as illustrated in FIG. 2. In this connection, the processing means may configured to only enable the user to select alphanumeric information presented on the display means such as the illustrated case where the selected kind of displayed information is phone number information. Advantageously, it may also be configured to determine the kind of the selected displayed information, to offer functions associated to the selected kind of information on the display means such as shown in FIG. 3, wherein to at least one kind of possible information the establishment of at least one kind of communication is associated as at least one function, and to activate a selected function. Thus, the at least one function may be the establishment of a communication such as the setup of a call or transmission of a short message via communication means 17 coupled to the processing means 15. Each of the functions offered on the display for the selected displayed information may be represented by a corresponding graphical icon. The apparatus is not restricted to the mobile phone shown in FIG. 4 and could take other forms such as a personal digital assistant phone.

The methodology describe previously in describing FIGS. 1-3 in connection with operation of an apparatus such as shown in FIG. 4 could be embodied in a computer readable medium 13 coupled to or part of the processing component 15 in which computer program code is stored, the program code realizing the disclosed methodology. An operating system component 18 is also shown coupled to or part of the processor component 15 for example for enabling communication via the communication component 17.

It should be understood that the components of the apparatus 14 may take various forms such as any kind of means known to any person of skill in the art for displaying information available for a specific content on a display of such an apparatus, any kind of means for detecting a selection of a displayed information by a user, any kind of means for determining the kind of the selected displayed information, any kind of means for offering functions associated to the selected kind of information on the display, wherein to at least one kind of possible information the establishment of at least one kind of communication is associated as at least one function, and any kind of means for activating a selected function.

Although only a few exemplary embodiments have been described in detail above, it will be readily appreciated that many modifications are possible in the exemplary embodiments without materially departing from the novel teachings and advantages disclosed herein. Accordingly, all such modifications are intended to be included within the scope of the claims. In the claims, means-plus-function clauses are intended to cover the structures described herein as performing the recited function and not only structural equivalents, but also equivalent structures. It is the express intention of the applicant not to invoke 35 U.S.C. Section 112, paragraph 6 for any limitations of any of the claims herein, except for those in which the claim expressly uses the words "means for" together with an associated function.

The presented embodiment of the mobile phone and the method according to the invention constitutes only one of a variety of possible embodiments, and it can thus be varied in many ways.

The invention claimed is:

1. Method for enabling a communication via a mobile phone, which method comprises:
   a) displaying information available for a specific content of an application on a display of said mobile phone, wherein said information comprises information identifying individual connection data but where the application presenting the content does not itself comprise a communication creation feature;
   b) said mobile phone detecting, after said displaying, a selection of a piece of the displayed information by a user and registering the selection in the mobile phone;
   c) determining, after said detecting and registering, a kind of the information selected by the user;
   d) after said determining, offering functions associated to the determined kind of information on said display, wherein at least to a kind of information identifying the individual connection data the establishment of at least one kind of communication is associated as at least one function; and
   e) said mobile phone activating a selected function upon the user selecting an offered function.

2. Method according to claim 1, wherein said information is presented on said display by a calendar application, a browser application or a messaging application.

3. Method according to claim 1, wherein the user is only enabled to select alphanumeric information presented on said display.

4. Method according to claim 1, wherein said selected kind of displayed information is phone number information.

5. Method according to claim 1, wherein said at least one function comprising establishment of a communication is setup of a call or transmission of a short message.

6. Method according to claim 1, wherein each of said functions offered on said display for the selected displayed information is represented by a corresponding graphical icon.

7. Apparatus comprising a processing component configured to provide display information available for a specific content to a display, wherein said information comprises information identifying individual connection data but where the application presenting the content does not itself comprise a communication creation feature, said processing component configured to detect, after display of said information, a selection of a piece of the displayed information by a user for registration in said apparatus, configured to determine, after said detection and registration, a kind of the information selected by the user, configured, after said kind is determined, to offer functions associated to the determined kind of information on said display, wherein at least to a kind of information identifying the individual connection data the establishment of at least one kind of communication is associated as at least one function, and said processing component configured to activate a selected function upon the user selecting an offered function.

8. Apparatus according to claim 7, wherein said processing component is configured run a calendar application, a browser application or a messaging application, which applications are configured to present said information on said display.

9. Apparatus according to claim 7, wherein said processing component is configured to only enable the user to select alphanumeric information presented on said display.

10. Apparatus according to claim 7, wherein said selected kind of displayed information is phone number information.

11. Apparatus according to claim 7, wherein said at least one function comprising establishment of a communication is setup of a call or transmission of a short message.

12. Apparatus according to claim 7, wherein each of said functions offered on said display for the selected displayed information is represented by a corresponding graphical icon.

13. Device comprising a processing component, a display and a communication component, said processing component being configured to provide display information available for a specific content to said display, wherein said information comprises information identifying individual connection data but where the application presenting the content does not itself comprise a communication creation feature, said processing component configured to detect, after display of said information, a selection of a piece of the displayed information by a user for registration in said apparatus, configured to determine, after said detection and registration, a kind of the information selected by the user, configured, after said kind is determined, to offer functions associated to the determined kind of information on said display, wherein at least to a kind of information identifying the individual connection data the establishment of at least one kind of communication is associated as at least one function, and said processing component configured to activate a selected function upon the user selecting an offered function.

14. Device according to claim 13, wherein the device is one of a mobile phone or a personal digital assistant phone.

15. An apparatus comprising:
  means for displaying information available for a specific content of an application on a display of said mobile phone, wherein said information comprises information identifying individual connection data but where the application presenting the content does not itself comprise a communication creation feature;
  means for detecting, after said detecting and registering, a selection of a piece of the displayed information by a user and registering the selection in the apparatus;
  means for determining, after said detecting and registering, a kind of the information selected by the user;
  means for offering, after said determining, functions associated to the determined kind of information on said display, wherein at least to a kind of information identifying the individual connection data the establishment of at least one kind of communication is associated as at least one function; and
  means for activating a selected function upon the user selecting an offered function.

* * * * *